(12) United States Patent
Smith et al.

(10) Patent No.: US 6,898,467 B1
(45) Date of Patent: May 24, 2005

(54) DISTRIBUTED CONTROL NETWORK FOR IRRIGATION MANAGEMENT

(75) Inventors: Brian J. Smith, Laguna Niguel, CA (US); Eric Schafer, Carlsbad, CA (US)

(73) Assignee: Signature Control Systems, Inc., Chino, CA (US)

( * ) Notice: Subject to any disclaimer, the term of this patent is extended or adjusted under 35 U.S.C. 154(b) by 112 days.

(21) Appl. No.: 10/627,877

(22) Filed: Jul. 28, 2003

Related U.S. Application Data

(63) Continuation of application No. 09/537,093, filed on Mar. 29, 2000, now Pat. No. 6,600,971.

(51) Int. Cl.$^7$ .................................................. G06N 5/00
(52) U.S. Cl. ............................ 700/20; 700/289; 710/21
(58) Field of Search ..................... 700/20, 289; 710/21; 714/31; 399/86

(56) References Cited

U.S. PATENT DOCUMENTS

| | | | |
|---|---|---|---|
| 4,015,366 A | | 4/1977 | Hall, III |
| 4,030,072 A | * | 6/1977 | Bjornsson .................... 714/31 |
| 4,183,089 A | * | 1/1980 | Daughton et al. ............. 710/21 |
| 4,190,350 A | * | 2/1980 | Donohue et al. ............. 399/86 |
| 4,244,022 A | | 1/1981 | Kendall |
| 4,445,180 A | * | 4/1984 | Davis et al. ................. 700/289 |
| 4,799,142 A | | 1/1989 | Waltzer et al. |
| 5,023,787 A | | 6/1991 | Evelyn-Veere |
| 5,208,855 A | | 5/1993 | Marian |
| 5,293,554 A | | 3/1994 | Nicholson |
| 5,479,339 A | | 12/1995 | Miller |
| 5,696,671 A | | 12/1997 | Oliver |
| 5,740,031 A | | 4/1998 | Gagnon |
| 5,740,038 A | | 4/1998 | Hergert |
| 5,870,302 A | | 2/1999 | Oliver |
| 5,927,603 A | | 7/1999 | McNabb |
| 5,956,248 A | | 9/1999 | Williams et al. |
| 5,963,650 A | | 10/1999 | Simionescu et al. |
| 5,971,294 A | | 10/1999 | Thompson et al. |
| 6,275,500 B1 | | 8/2001 | Callaway, Jr. et al. |
| 6,314,340 B1 | | 11/2001 | Mecham et al. |
| 6,343,255 B1 | | 1/2002 | Peek et al. |

* cited by examiner

Primary Examiner—Wilbert L. Starks, Jr.
(74) Attorney, Agent, or Firm—Posz Law Group, PLC

(57) ABSTRACT

A system and method for operating a distributed control network for irrigation management. The system incorporates several irrigation controllers wherein each of the controllers can transmit, receive and respond to commands initiated by any device or satellite controller on the network, a communication bus that is connected to the controllers, a central computer that is connected to the bus, several sensing devices that are connected to each controller, and several sprinkler valves that are connected to each controller. The controllers can be operated in local mode via a user interface and in a remote mode via a wireless connection. The controllers are capable of monitoring and acknowledging the commands that are transmitted on the bus.

14 Claims, 5 Drawing Sheets

DISTRIBUTED CONTROL NETWORK FOR IRRIGATION MANAGEMENT

RELATED APPLICATION

This application is a continuation of U.S. patent application Ser. No. 09/537,093, filed Mar. 29, 2000, now U.S. Pat. No. 6,600,971, which is incorporated herein by reference.

BACKGROUND OF THE INVENTION

1. Field of the Invention

The present invention relates to an irrigation control system. More particularly, the invention relates to a peer-to-peer irrigation sprinkler control system with the ability to monitor and control the entire system from any satellite controller.

2. Description of the Related Art

In the area of irrigation management and control, there are two significant types of control systems that are used: the stand-alone controller and the central-satellite system. FIG. 1 shows a traditional stand-alone controller 1, which is typically used for smaller irrigation sites, with outputs varying from four (4) to approximately forty eight (48) outputs. The stand-alone controller 1 is a device that is usually wall mounted, and offers a user interface such as a keypad and a liquid crystal display. With the user interface, a user can set up automatic watering programs, perform manual watering, as well as perform some additional functions for irrigation control.

Connected to the stand-alone controllers 1 are sensors 3 and irrigation solenoid valves 5. The sensors 3 monitor multiple variables that typically include the amount of rainfall, water flow and power consumption. Then, the sensors 3 provide this data to the stand-alone controller 1. Also connected to the stand-alone controller 1 are a plurality of valves 5. The valves 5 are typically 24 VAC solenoid operated valves. The valves 5 are connected to the stand-alone controller 1 with field wiring 7 that delivers the 24 VAC to the valve solenoid.

The stand-alone controller 1 provides valve control and records sensor data as input to various programmable features. The controllers 1 are set-up and programmed via a graphical user interface on the controller. It is known in the art that typical irrigation controllers contain microprocessors as disclosed in U.S. Pat. No. 5,956,248, by Williams et al.

In larger installations, multiple stand-alone controllers must be used because the distance between the controller and valve stations is limited by a maximum amount of tolerable wiring impedance. However, sites that utilize multiple stand-alone controllers are difficult to maintain because they must be managed independently at the location of the installation.

An alternative to the multiple stand-alone controllers solution for large installations is a conventional central-satellite control system shown for example in FIG. 2. U.S. Pat. No. 4,244,022 entitled "Irrigation Control System" by Kendall, discloses a master-slave type control system for large-scale irrigation that incorporates a central computer 9 connected to a plurality of satellite controllers 11 which are in turn connected to control irrigation solenoid valves. Central-satellite control systems generally consist of various sense and/or control devices linked together via a communication bus 13. This distributed control methodology allows the management of large sites from a single location. A typical installation will contain multiple field controllers, or satellites 11, and a single central control center 9. The central control center is managed by a personal computer 9.

The satellite controller 11 is a field device, similar to a stand-alone controller, that offers both valve solenoid control and various sensor interfaces. More sophisticated satellites also have a user interface for local programming.

A major difference between the satellite controller 11 and the stand-alone controller 1 is the communication bus 13 interface. The communication bus 13 interface allows the satellites 11 to communicate with the remote central computer 9. The type of communication bus 13 varies depending on the requirements of each individual site. Typical central-satellite systems use twisted pair wire, radio modems, analog telephone modems, wireless communication (RF VHF, UHF, microwave frequencies), fiber optics, power lines, telephone cables, cellular telephones, infrared, wireless pager systems, or television cables for the communication bus.

In managing large installations, the central-satellite system has some advantages over using multiple stand-alone controllers. The central-satellite system significantly reduces the manpower and level of effort required to maintain a large installation. For example, problems at a satellite location can be instantly reported to the central computer. Also, complex watering schedules can be realized, such as those based on evapotranspiration, by utilizing the computer's graphical user interface and processor capabilities. U.S. Pat. No. 5,208,855 by Marian, discloses one such method and apparatus for irrigation control using evapotranspiration. U.S. Pat. No. 5,870,302 by Oliver discloses a system and method for using evapotranspiration in controlling automated and semi-automated irrigation systems.

Despite the advantages of the central-satellite system, problems still exist with this system. The cost of a central-satellite system can be very high. For example in a smaller site consisting of 5–10 satellite controllers, the costs associated with operating and maintaining a central computer are not feasible, even though a networked solution is preferred. Additionally, there is a large and difficult learning curve for a system operator to fully understand and utilize the capabilities of the system. Moreover, the satellites are mostly simple receivers that can only communicate on the bus when specifically addressed by the central computer.

The Oliver patent discloses that satellite controllers may communicate with other satellite controllers but only to pass data along from a communications and electronic control device. The Oliver patent does not disclose satellite controllers that are capable of monitoring and controlling the entire irrigation control system. Similarly, U.S. Pat. No. 5,740,031 by Gagnon, discloses irrigation controllers that can transmit and receive communications with other irrigation controllers and computer interfaces but in the capacity of a repeater when the central computer can not communicate directly with a controller due to signal attenuation and/or reflection. Again, Gangon does not disclose an irrigation controller capable of monitoring and controlling the entire system. If the central computer fails, then the entire system must operate as individual stand-alone controllers. The present invention provides a system, method and apparatus to meet these needs and address these deficiencies.

BRIEF SUMMARY OF THE INVENTION

The present invention is a system, method and apparatus for managing and controlling irrigation by forming an irrigation control system. The irrigation control system forms a peer-to-peer network of satellite irrigation controllers, as opposed to known master-slave or client-server type systems. The present invention may be monitored and operated from a central computer or at any one of the satellite controllers. The use of peer-to-peer architecture allows any satellite controller to address any other satellite controller. Thus, the user can monitor and control the entire system from any satellite controller, or node in the network. The invention provides peer-to-peer control of the entire system at each satellite controller through the use of a high speed micro-controller.

The present invention can be used to meet any type of irrigation needs. For example, the irrigation control system can be used to irrigate both large and small areas. When the system is used to irrigate large areas, a central computer is connected to the communication bus and becomes part of the peer-to-peer network. The central computer provides the additional computing power needed to manage large irrigation sites. The central computer provides a convenient centralized site, for example, for collecting, downloading and programming information. After two or three controllers, the central computer is a desirable feature. For other smaller irrigation sites, the central computer is not needed. The central computer could be any computer, such as a personal computer.

As mentioned above, each satellite controller utilizes a high-speed micro-controller to accomplish its functions. A flash memory micro-controller is acceptable. A primary responsibility of the micro-controller is to monitor and control the communication bus. The bus is a half-duplex communication bus that allows only one device to transmit at any one time. In order for the peer-to-peer architecture to function, proper bus management is imperative to ensure reliable communication between the devices.

The present invention includes a software algorithm used by the micro-controller to monitor and control the communication bus. The software algorithm minimizes bus collisions and provides a message acknowledgement scheme to the transmitting device providing feedback of a successful transmission. If acknowledgements are not received within a prescribed amount of time, a number of transmit retries can be used until the acknowledgement is detected or the operation is aborted. If the operation is aborted, then an alarm condition is recorded. Furthermore, the messages are packaged into small packets of data, allowing all devices an opportunity to take control of the bus.

In the present invention, the communication bus can take a variety of conventional forms.

One example of flexibility of the peer-to-peer architecture is realized by using a DTMF radio receiver, which receives and decodes tones from handheld radios for remote system control. The DTMF radio receiver is optimally placed at any node in the network. A DTMF message is sent to the receiver and the message is prefaced with a specific satellite controller address. The receiver then forwards the message onto the communication bus and the message is received at the specified satellite controller. (Other conventional systems require a central computer for satellite to satellite communications.)

According to the invention, there is provided a system for operating a distributed control network for irrigation management. There are irrigation controllers, each of the controllers being responsive to a command from an other controller, wherein the controllers are capable of transmitting, receiving and responding to a command, and wherein the controllers can be operated in a local mode via a graphical user interface and in a remote mode via a wireless connection. There is a communication bus, connected to the controllers, wherein the controllers are capable of monitoring commands and the controllers are capable of acknowledging the commands. Also provided is a central computer, connected to the bus, communicating with the controllers via the bus. There are sensing devices connected to each of the controllers. Sprinkler valves are connected to the controllers.

Further in accordance with the invention, there is provided a method for operating a distributed control network for irrigation management. There is a step if initiating a command at one of several irrigation controllers, wherein said controllers are connected to sensing devices and sprinkler valves. There is a step of transmitting the command from the controller to an other controller via a communication bus. There is also a step of monitoring the command on the communication bus by the controller. There is a step of receiving the command at the other controller, acknowledging said command by the other controller, acting on said command by the other controller; and providing a connection from a central computer to the controllers on the communication bus.

These and other objects, features and advantages of the present invention are readily apparent from the following drawings and detailed description.

DETAILED DESCRIPTION OF THE PREFERRED EMBODIMENT

Figure 1:
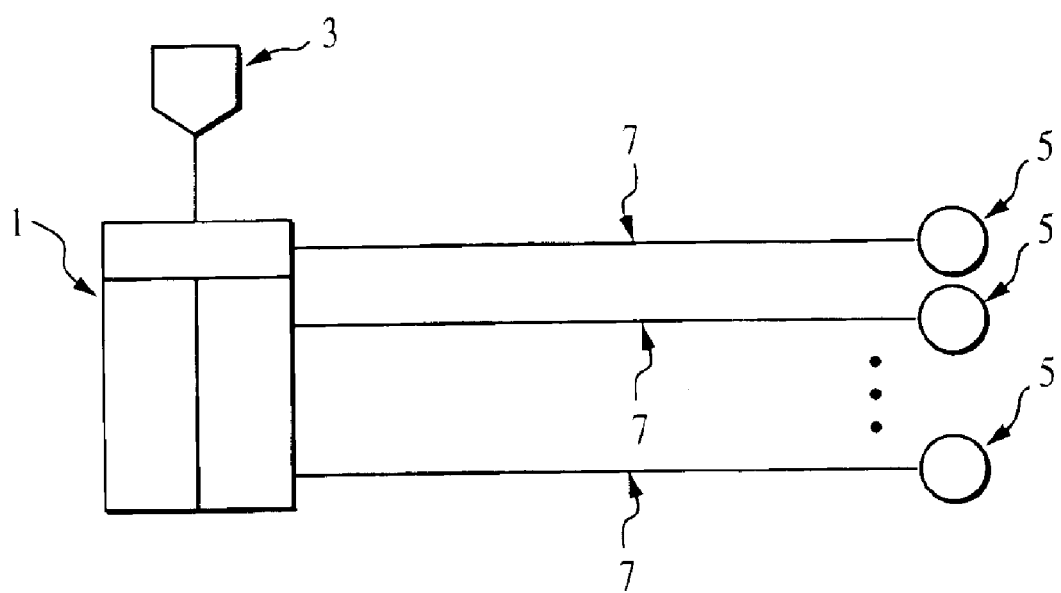
FIG. 1 is a block diagram of a prior art stand alone controller.
Figure 2:
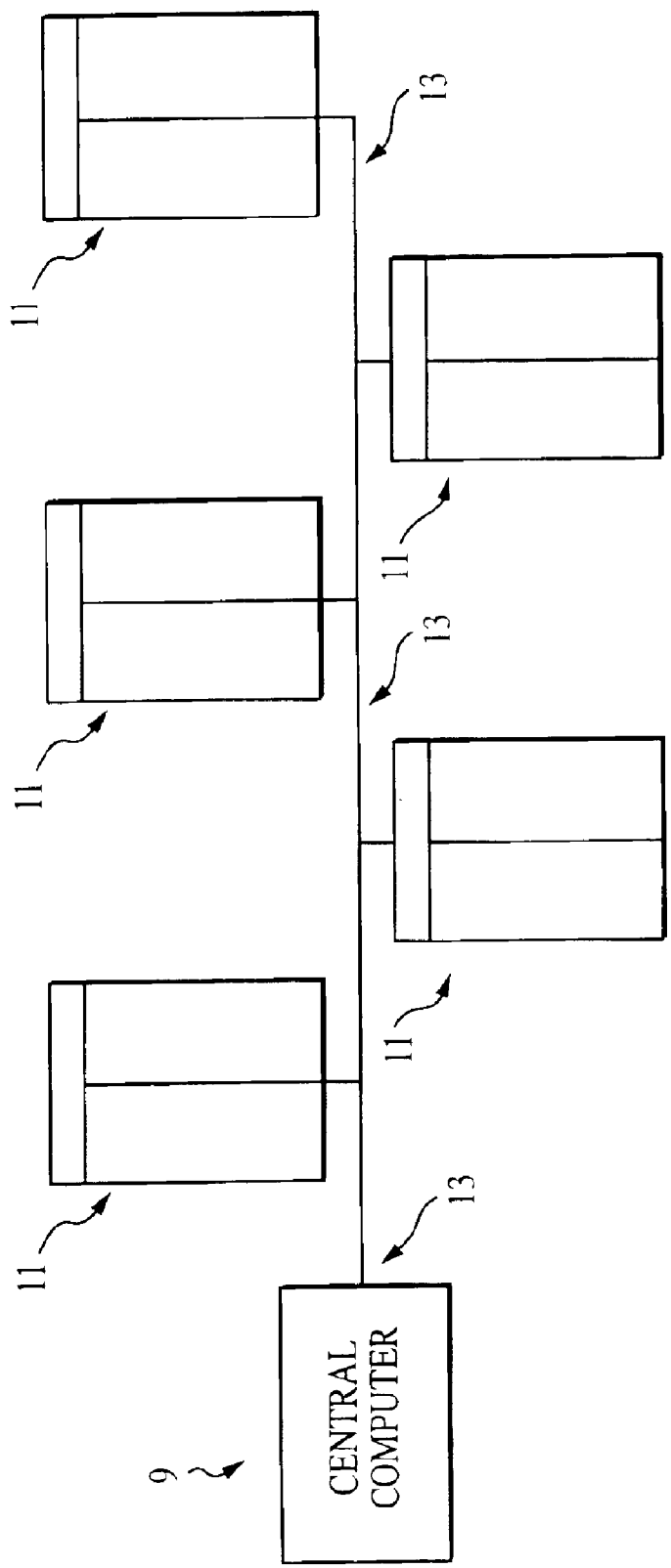
FIG. 2 is a block diagram of a prior art Central-Satellite (master-slave or client-server) irrigation control system.
Figure 3:
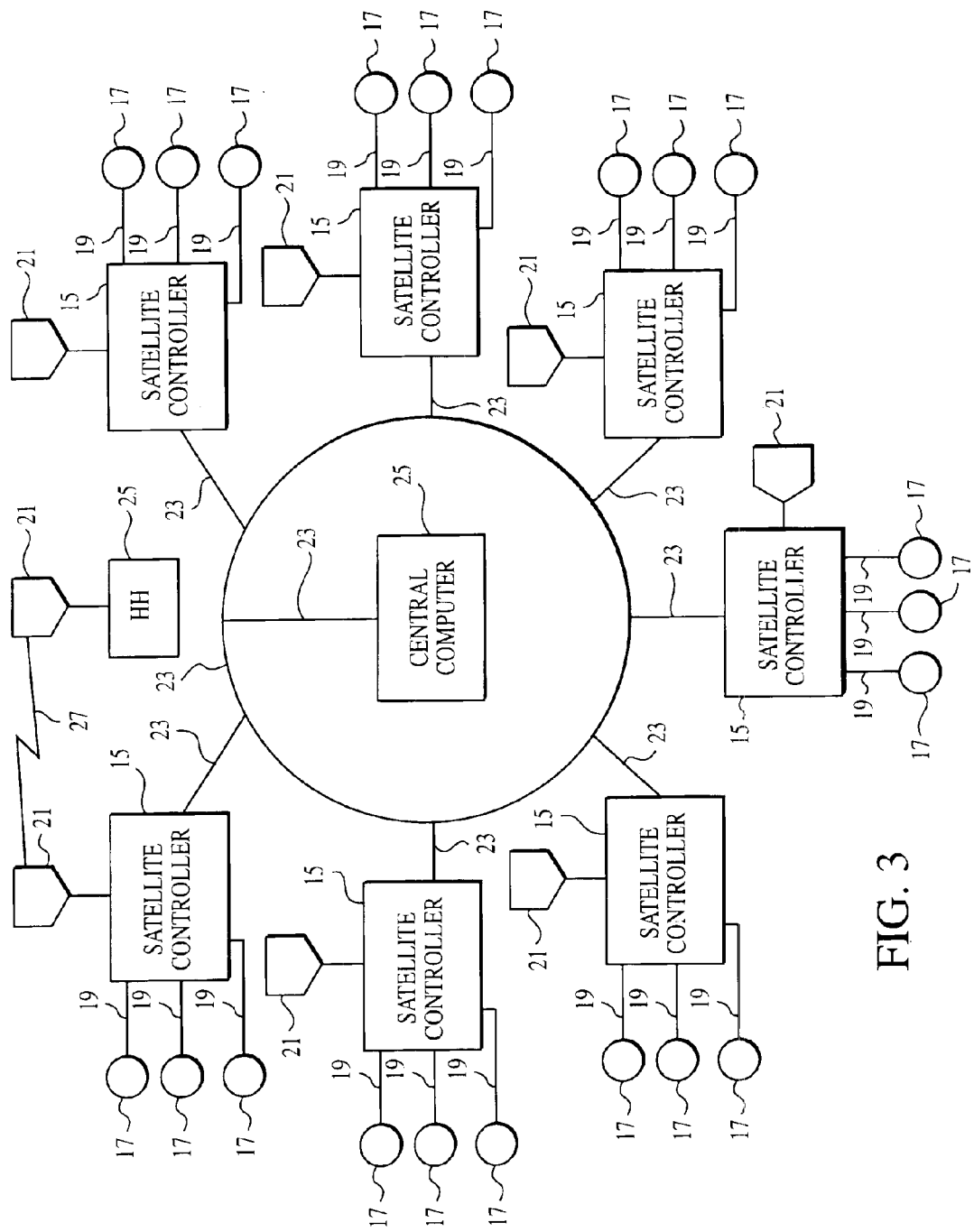
FIG. 3 is a block diagram of a peer-to-peer irrigation control system.

Reference is made to FIG. 3, which depicts the block diagram of the distributed control network for irrigation management. The control network is a peer-to-peer network wherein the entire system, or any portion thereof, can be monitored and operated from any node in the network. Several satellite controllers 15 are connected to one another, and further connected to a central computer 25, all via a communication bus 23. FIG. 3 is not meant to limit the number of satellite controllers 15 that can be connected to the communication bus 23. The satellite controllers 15 operate as nodes in the peer-to-peer network wherein the entire control system can be monitored and operated.

In the system depicted in FIG. 3, the satellite controllers 15 perform a variety of functions. The satellite controllers 15 control the solenoid operated valves 17 and interface with various sensors 21. Any standard solenoid is acceptable. Preferably, the satellite controller can operate up to 96 valves.

The satellite controllers 15 can be operated both locally at the satellite controller and remotely from other devices on the bus 23. When the satellite controller is in local mode, the satellite controller 15 can operate the valves that feed directly off of that controller. For example, one might operate the satellite controller 15 in local mode, for example, to do maintenance. One might operate the controller in local mode, for example, to do maintenance. Preferably, operating in local mode has no effect on programmed watering schedules. The satellite controllers 15 are operated in local mode advantageously via a graphical user interface attached to the satellite controller 15. The satellite controller preferably includes an LCD user interface.

In addition to operating in local mode, the satellite controller 15 can be operated in remote mode. When operated remotely, the satellite controller 15 can be monitored and controlled from any node in the network, such as the central computer 25 or any other satellite controller 15. The satellite controller 15 is typically operated remotely to recognize complex watering schedules such as evapotranspiration. The user can remotely control a satellite controller 15 which in turn can control some or all of the other satellite controllers 15. Thus, a significant advantage, the ability to share system resources, is realized by utilizing the peer-to-peer architecture. All controllers 15 can be repeaters, and can maintain links to all other controllers. All controllers 15 can read or sense data on any other controller on the bus.

In one variation of the invention, a DTMF radio receiver, which receives and decodes tones from handheld radios for remote systems, can be optimally placed at one of the satellite controllers 15. The user can send a DTMF message to the receiver that can be addressed to any satellite controller 15. The DTMF message is prefaced with a satellite address and is forwarded on the bus from the satellite controller 15 with the receiver to the controller that was addressed in the message. Thus, the message is received and forwarded on the bus to the specified satellite controller 15.

The satellite controllers 15 can perform a variety of functions, whether in local or remote mode. From the controller 15, the user can manually initiate watering of an irrigation site which overrides any automatic watering schedule. At front controller 15 or another controller on the network, the user can also adjust/review manual operation, sensor review, and watering schedules, at any other controller on the network. Additionally, the satellite controllers 15 can be programmed to realize complex watering schedules based on the input received from its sensors 21 such as evapotranspiration. Additional functions performed by the satellite controllers 15 include, for example, that sensors, programs, control functions can be transmitted onto the network for review, action from, and by any other satellite, central computer, or remote handheld devices.

An appropriate satellite controller is commercially available under the trademark Tora LTD Plus™ or Rainbird Par™, for example. However, other controllers are also adequate and available.

Connected to each satellite controller 15 is a plurality of sprinkler valves 17. The sprinkler valves 17 are solenoid operated and are connected to the satellite controller 15 via field wiring 19. The field wiring 19 delivers 24 VAC to the valve solenoids.

Also connected to each satellite controller 15 are various sensors 21 that provide input to the controller 15. The sensors 21 typically measure rainfall, water flow, water pressure, temperature, wind speed, wind direction, relative humidity, solar radiation, and power consumption.

As shown in FIG. 3, the satellite controllers 15 are connected indirectly to one another via a communication bus 23. The type of communication bus 23 can vary depending on the requirements of each individual site. Typical systems will be implemented with twisted pair wire, radio modems, analog telephone modems and so forth. The communication bus 23 is preferably a half-duplex communication bus that allows only one device to transmit at any one time, to avoid data collisions on the bus. Full duplex is an option.

Also shown in FIG. 3 is the central computer 25 that is connected to the communication bus 23. The central computer 25 can be remotely located from the satellite controllers 15 and has the capability to monitor and operate the entire system. The central computer 25 is typically used for management of large irrigation sites. One advantage of the present invention, is that the central computer 25 is not always necessary. In prior art inventions, the central computer 9 was necessary in order to monitor and control all of the satellite controllers 11 because the satellite controllers 11 were not capable of monitoring and controlling the entire system. However, in the present invention, the monitoring and control functions can be performed at any satellite controller 15. Thus, the central computer 25 is not necessary for all applications. Typically, the central computer 25 will be present for large irrigation site management and will not be present for smaller irrigation site management. Central computers may poll satellite controllers and then react by adjusting schedules, etc., and to download new schedules. A general purpose computer, such as the IBM™ PC, is appropriate.

FIG. 3 also illustrates a remote device 25, here a hand held unit. If the central computer 25 becomes disconnected from the bus 23, or if communications are disrupted, communications can occur via bus 23 and the remote device 25, via a remote connection 27.

Figure 4:
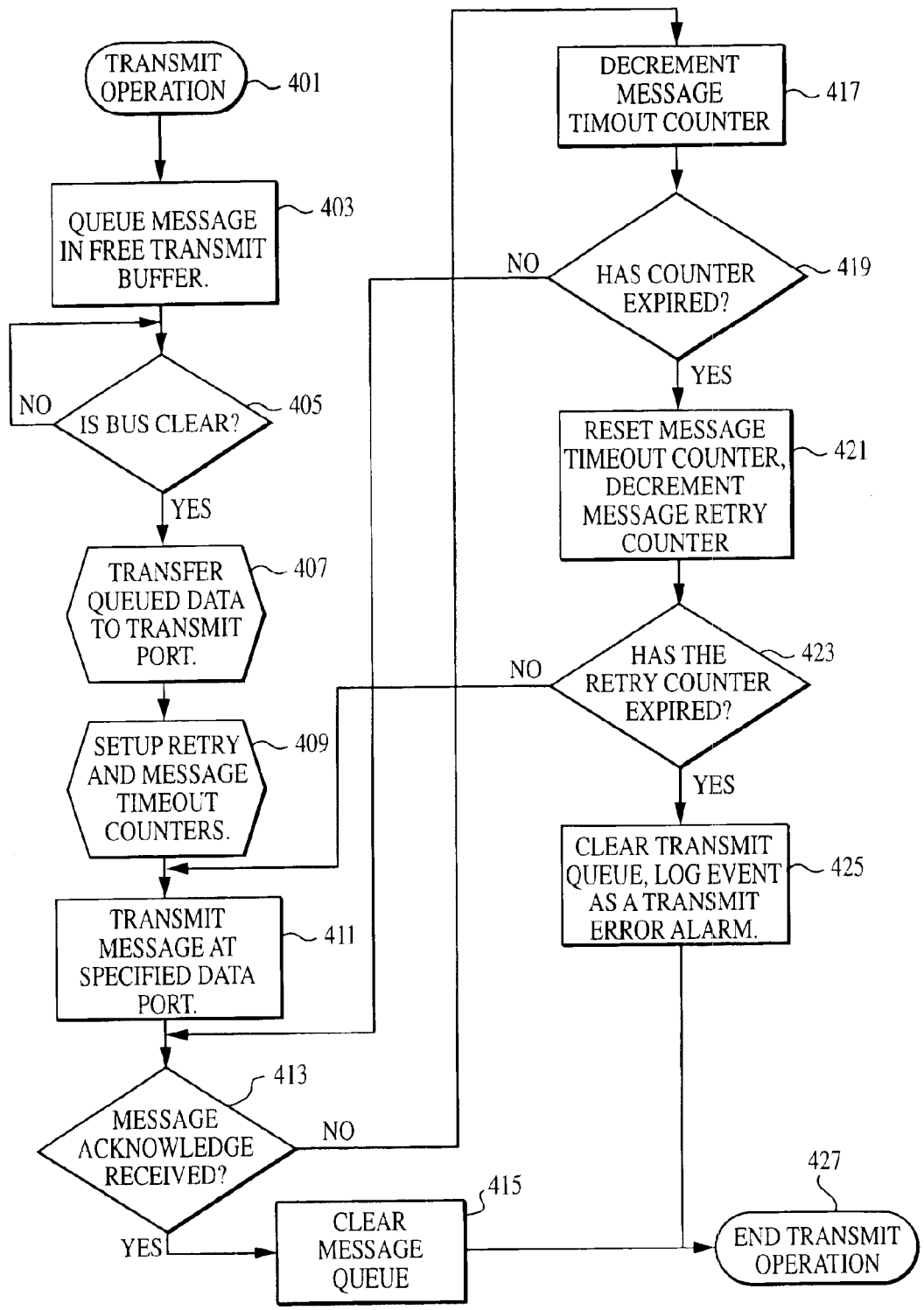
FIG. 4 is a flowchart of a software algorithm used by a micro-controller in satellite controllers to provide a message acknowledgment scheme and to give the transmitter feedback for a successful message transmission.

Referenced in FIG. 4 is a flowchart of an appropriate software algorithm used by the micro-controller in a satellite controller 15 to provide a message acknowledgment scheme and to give the transmitter feedback for a successful message transmission. The algorithm is designed to ensure proper bus management by the micro-controller. Other appropriate algorithms will work, and, indeed, one of skill in the art will appreciate similar algorithms.

Reference is made to FIGS. 3 and 4. Step 401 is the transmit operation. At step 403, a message is queued in a free transmit buffer. Step 405 queries whether the communication bus 23 is clear. If the bus 23 is not clear, then step 405 is repeated. If the bus 23 is clear, then the message is transferred from the transmit buffer to a transmit port at step 407. Next at step 409, a retry counter and a message timeout counter are set-up. After the counters have been set-up, then step 411 transmits the message from the transmit port to the specified data port. Step 413 queries whether a message acknowledge is has been received. If the message has been acknowledged, then the message queue is cleared at step 415 and the transmit operation ends at step 427. The bus 23 is then available for other transmissions.

However, if the message has not been acknowledged at step 413, then it proceeds to step 417 where the message timeout counter is decremented. Step 419 queries whether the timeout counter has expired. If the counter has not expired, then the process goes back to step 411. If the timeout counter has expired, then step 421 resets the message timeout counter and decrements the message retry counter. Step 423 queries whether the message retry counter has expired. If the retry counter has not expired at step 423, the process returns to step 411. If the message retry counter has expired, then step 425 clears the transmit queue and the event is logged as a transmit error alarm. The end transmit operation then occurs at step 427.

Figure 5:
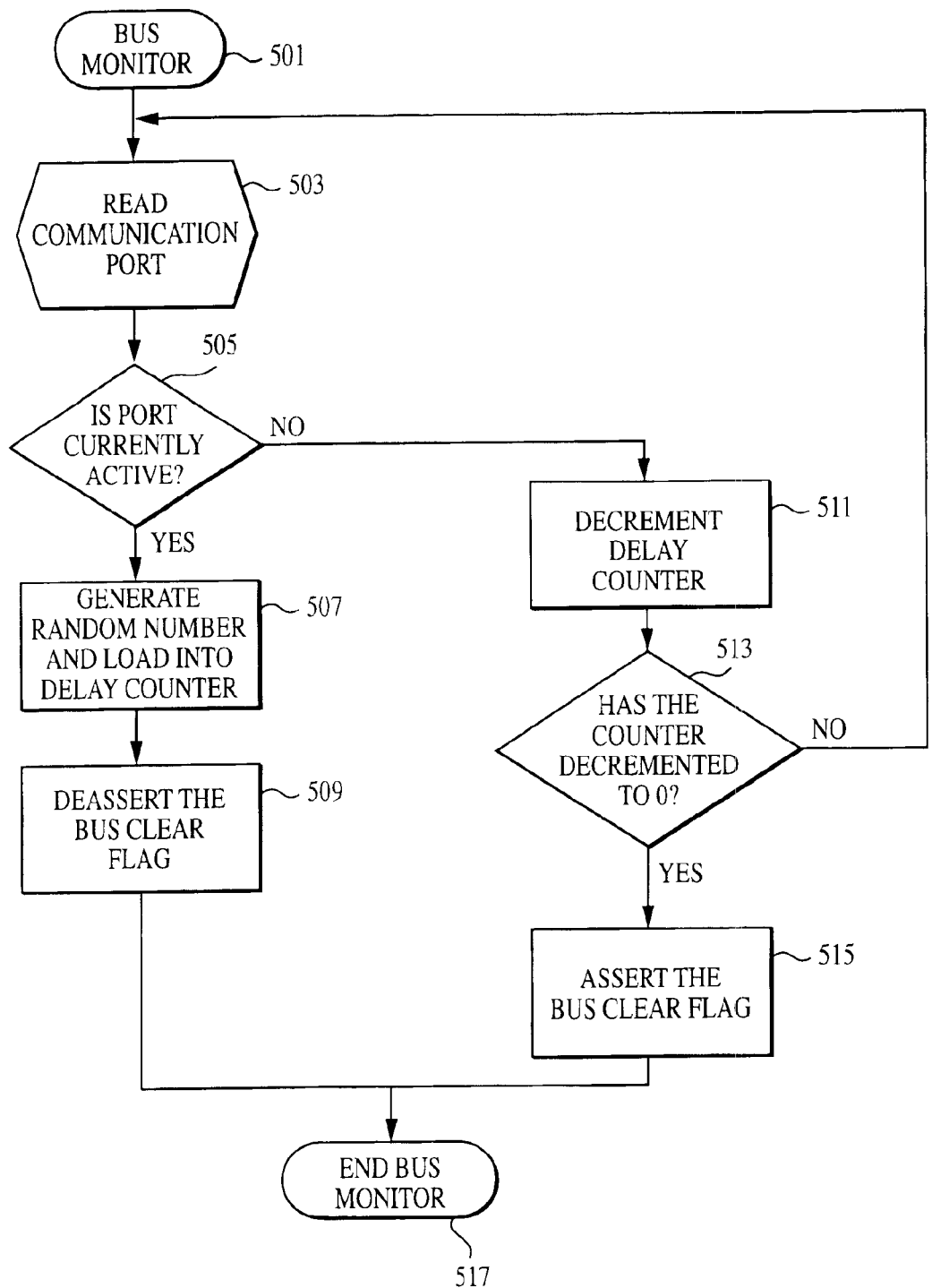
FIG. 5 is a flowchart of the software algorithm used by the micro-controller to monitor a communication bus.

Referenced in FIG. 5 is a flowchart of the software algorithm used by the micro-controller in each satellite controller 15 to monitor the communication bus 23. Step 501 signals the bus monitor operation. At step 503, a communication port is read. Step 505 queries whether the port is currently active. If the communication port is currently active, then step 507 generates a random number is loads the number into a delay counter. Step 509 deasserts the bus clear flag. The bus monitor process is ended at step 517.

However, if the communication port is not active at step 505, then step 511 decrements the delay counter. Then, step 513 queries whether the delay counter has decremented to zero. If the delay counter is not at zero, then the process goes back to step 503 and repeats the process. If the delay counter is at zero, then step 515 asserts the bus clear flag. Then, the bus monitor process is ended at step 517.

While the preferred mode and best mode for carrying out the invention have been described, those familiar with the art to which this invention relates will appreciate that various alternate designs and embodiments for practicing the invention are possible, and will fall within the scope of the following claims.

What is claimed is:

1. A method for communicating instructions in a peer-to-peer distributed network system, the method comprising the steps of:

(A) initiating at least one command at at least one of a plurality of controllers, each of the plurality of controllers being responsive to commands received and capable of initiating and transmitting at least one command to at least one other of the plurality of controllers;

(B) determining whether the communication bus is clear;

(C) if the communication bus is clear, transmitting the at least one command from the at least one of the plurality of controllers to the at least one other of the plurality of controllers via the communication bus;

(D) receiving the at least one command, from the at least one of the plurality of controllers, at the at least one other of the plurality of controllers;

(E) determining if a message acknowledge, generated by the at least one other of the plurality of controllers, is received at the at least one of the plurality of controllers;

(F) if the message acknowledge is not received, determining whether a timeout counter has expired and attempting to retry transmitting the at least one command if the timeout counter has not expired;

(G) if the timeout counter is determined to have expired, determining whether a retry counter has expired; and (H) if the retry counter is determined to have expired, activating a transmit error alarm;

wherein said at least one transmitted command includes said at least one command initiated at the at least one of the plurality of controllers and wherein said at least one initiated command is independent of at least one command previously received by the least one of the plurality of controllers.

2. The method of claim 1, further comprising the step of providing the plurality of controllers connected via a communication bus.

3. The method of claim 1, the step of transmitting the at least one command, further comprising:

(A) queuing the at least one command in a transmit buffer;

(B) transferring the at least one command from the transmit buffer to a transmit port;

(C) initiating the retry counter and the timeout counter; and (D) transmitting the at least one command from the transmit port to a specified data port at the at least one other of the plurality of controllers.

4. The method of claim 3, further comprising the step of, if the message acknowledge is received, clearing the at least one command queued in the transmit buffer.

5. The method of claim 1, the step of determining whether the timeout counter has expired further comprising:

(A) decrementing the timeout counter; and (B) querying whether the timeout counter has expired.

6. The method of claim 1, the step of determining whether the retry counter has expired further comprising:

(A) resetting the timeout counter; and (B) decrementing the retry counter.

7. The method of claim 1, wherein if the retry counter is determined to have expired, further comprising the step of indicating that transmission of the at least one command failed.

8. The method of claim 1, further comprising the step of, if the retry counter is determined not to have expired, attempting to retry transmitting the at least one command.

9. The method of claim 1, wherein the at least one command is selected from a group comprising: adjust operation, review operation, sensor review, water schedule, and initiate watering.

10. A method for communicating instructions in a peer-to-peer distributed network system having a plurality of controllers connected via a communication bus, each of the plurality of controllers being responsive to commands received and capable of initiating and transmitting at least one command to at least one other of the plurality of controllers, the method comprising the steps of:

(A) reading a communication port at one of the plurality of controllers;

(B) determining whether the communication port is currently active;

(C) if the communication port is currently active, indicating that the communication bus is not clear;

(D) if the communication port is not currently active, determining whether a delay counter is expired; and (E) if the delay counter is expired, indicating that the communication bus is clear.

11. The method of claim 10, the step of indicating that the communication bus is not clear further comprising:

generating a random number;

loading the random number into the delay counter; and deasserting a bus clear flag.

12. The method of claim 10, the step of determining whether the delay counter is expired further comprising:

decrementing the delay counter;

determining whether the delay counter determining whether the delay counter has decremented to zero; and if the delay counter has not decremented to zero, returning to step (A).

13. The method of claim 10, the step of indicating that the communication bus is not clear further comprising asserting a bus clear flag.

14. The method of claim 10, wherein the commands are selected from a group comprising: adjust operation, review operation, sensor review, water schedule, and initiate watering.

* * * * *